United States Patent

[11] 3,619,206

[72] Inventors: Mervyn Thomas Arthur Evans Lawrence; Laurence Ian Irons, St. Albans, both of England
[21] Appl. No.: 863,709
[22] Filed: Oct. 3, 1969
[45] Patented: Nov. 9, 1971
[73] Assignee: Lever Brothers Company, New York, N.Y.
[32] Priority: Oct. 11, 1968
[33] Great Britain
[31] 48,379/68

[54] MODIFIED PROTEIN
11 Claims, No Drawings

[52] U.S. Cl. .................................................. 99/113, 260/112
[51] Int. Cl. ............................................................ A23l 1/32
[50] Field of Search .......................... 99/113, 114, 144, 14, 260/112

[56] References Cited
UNITED STATES PATENTS
2,827,419  3/1958  Tourtellotte et al. ......... 260/112

Primary Examiner—A. Louis Monacell
Assistant Examiner—Robert M. Elliott
Attorneys—Louis F. Kline, Jr., Melvin H. Kurtz and Edgar S. Ruff ABSTRACT: Egg yolk protein is acylated with the internal anhydride of a dicarboxylic acid to give an N-carboxyacylated egg yolk protein useful in preparing aqueous oil emulsions, such as salad dressings and mayonnaise, that are sterilizable by heat without coagulation.

MODIFIED PROTEIN

This invention relates to modified egg yolk, and its use in emulsions, especially in salad dressings.

Egg yolk, normally hen egg yolk, is used in the preparation of salad dressings and, in particular, for mayonnaise preparation. Mayonnaise consists of a dispersion of an edible oil in water which contains egg yolk, spices, and acid, such as vinegar. The function of the egg yolk is to thicken the emulsion and to act as an emulsifier, and additional emulsifiers and stabilizing agents are often also incorporated. In preparing a salad dressing it is usual to separate the egg yolk from the white, but sometimes whole egg is used to provide the egg yolk.

The solid constituents of egg yolk, forming about half of the egg yolk material, are highly complex and include lipoproteins, (in particular lipovitellin and lipovitellenin, the total protein content being about 30 percent by weight of the total solids), together with fatty acid triglycerides, phospholipids (especially the emulsifying agent lecithin), and small amounts of carbohydrates and minerals. The proteins are irreversibly denatured by heating to 100° C., as in the boiling of an egg.

Edible emulsions containing egg yolk cannot be sterilized by heating without the denaturation and coagulation of egg yolk protein, and hence the destruction of the emulsion, and although the acid in mayonnaise and other salad dressings acts as a preservative against bacterial growth it would be advantageous to be able to heat-sterilize such compositions, particularly against mould growth and bacteria that grow under acid conditions. One method which has been adopted for solving this problem is to denature egg yolk by heating and to grind up the solid product and incorporate the resulting finely divided particles in the mayonnaise and so obtain a suspension of the particles in the emulsion.

It has now been discovered that the free amino groups present in egg yolk protein can be acylated with the internal anhydride of an edible dicarboxylic acid to give a modified egg yolk that is sufficiently stable to heat for sterilization to be effected without coagulation. The resulting modified egg yolk has a large number of the N-terminal amino groups and free amino groups arising from the lysine residues of the protein protected by carboxyacyl groups, which are thus linked by peptide bonds in the same way that the amino-acid residues of the protein are linked by peptide bonds, and the charge and other characteristics of the protein are thus altered so that stability to heat is conferred without loss of the desirable properties of the egg yolk.

Accordingly the modified egg yolk of this invention comprises N-carboxyacylated egg yolk protein.

The modified egg yolk is preferably prepared from the separated egg yolk but it can also be prepared from whole egg, for the proteins of the egg white such as ovalbumin are also stabilized against heat coagulation by the formation of carboxyacyl derivatives.

The carboxyacyl group introduced is preferably a carboxyaliphatic acyl group, particularly one containing from 4 to 10, and preferably 4, 5 or 6, carbon atoms, for instance a $\beta$-carboxyacrylyl or $\gamma$-carboxybutyryl group, and especially a $\beta$-carboxypropionyl group. These specific groups are those derived from fumaric, glutaric and succinic acids, respectively, one of the carboxy groups of the dibasic acid providing the peptide linkage with the free amino groups of the protein, and the other providing a free acid group. Each of these three dibasic acids occurs naturally as a metabolic product in humans, and the free acids are formed when the carboxyacylated protein is digested and the peptide bonds hydrolyzed.

The modified protein is prepared by acylating egg yolk protein in aqueous solution with the internal anhydride of a dicarboxylic acid. The carboxyacyl group can be introduced by allowing an aqueous solution of the egg yolk protein to stand at 0° C. with the internal anhydride of the appropriate dicarboxylic acid, in particular maleic, glutaric or succinic anhydride. It is preferable to conduct the reaction at a pH of from 6 to 9, especially from 7 to 8, for instance using a suitable buffer, in order to promote acylation rather than hydrolysis of the anhydride which occurs as a side-reaction with liberation of the free dicarboxylic acid. The action of the buffer can be supplemented by progressive addition of alkali to neutralize the free carboxylic acid groups formed.

The proportion of anhydride used will reflect the degree of acylation required and the extent of loss of anhydride by hydrolysis under the particular conditions used. The degree of acylation, that is, the proportion of the reactive acylatable amino groups in the modified egg yolk protein that are acylated, is generally at least 20 percent, preferably at least 50 or 60 percent, and better still at least 70 or 80 percent; 80 percent or more acylation is readily achieved by using a large excess of anhydride, for instance a 20 fold excess. The amount of reactive amino group present in a particular egg yolk protein can be determined by standard methods such as the Van Slyke method using nitrous acid, or the ninhydrin color reaction, and the amount of anhydride used can be calculated accordingly. Some acylation of hydroxy and thiol groups in the protein also occurs. The degree of acylation of amino group achieved can be determined by measuring the amount of reactive amino group remaining in the product. If desired, any byproduct dicarboxylic acid or excess anhydride unhydrolyzed at the completion of the reaction can be removed by dialysis or gel filtration, and electrodialysis can be employed to accelerate the removal of acid. The product is conveniently dried, for instance freeze-dried or spray-dried, to produce a cream-colored powdered solid which can be used as the egg yolk solids in making salad dressings.

The invention also includes an aqueous oil emulsion containing the carboxyacylated egg yolk protein, preferably an oil-in-water emulsion, and especially one containing an edible triglyceride oil, particularly a vegetable oil. Such emulsions include salad dressings and mayonnaise having vegetable oil contents by weight of at least 25 percent, and preferably not less than 50, 65, 75 or 80 percent. Suitable triglyceride oils are olive, cottonseed, soyabean and corn oils. Preferably the emulsions have a pH of less than 4, and especially less than 3, with acid such as acetic, lactic, malic, citric or tartaric acids provided, for instance, by vinegar or acid fruit juices.

The consistency of the emulsion will depend on the relative proportion of aqueous and oil phases, and can be adjusted according to requirement.

It is desirable to supplement the emulsifying action of the egg yolk by the use of additional emulsifiers and stabilizers such as are used in edible products, and an emulsifier or emulsifier mixture having a suitable hydrophilic-lipophilic balance, for instance of 8, can be used.

The proportion of carboxyacylated egg yolk protein employed will be that corresponding to the amount of protein in unmodified egg yolk solids. Generally from 0.05 to 10, and preferably from 0.1 to 5 percent by weigh of the solid products from carboxyacylation of egg yolk are employed.

In making the emulsion water and oil are emulsified in the presence of the modified protein; it is convenient to prepare an aqueous phase containing the carboxyacylated egg yolk protein and any stabilizing agent and flavoring ingredients and an oil phase containing any additional emulsifier, and to run the oil phase slowly into the aqueous phase with very vigorous stirring, so that an oil-in-water emulsion is formed. Where acid is to be present this should either be added to the remainder of the aqueous phase immediately before the emulsion is made, or introduced after the emulsion has been prepared, and in this way the pH of the emulsion can adjusted to less than 4 as required.

The emulsion can then be sterilized by heat, for instance by maintaining it at 90° C. for 10 minutes. An 80 percent $\beta$-carboxypropionylated egg yolk protein is stable at 100° for at least 30 minutes. If desired, cooked or uncooked vegetables covered with such an emulsion can be sterilized or partly sterilized in this way.

The carboxyacylated egg yolk protein of the invention can also be used in other food products where egg yolk protein is used and coagulation of the protein by heat is to be avoided, for instance in ice cream where the ice cream mix is pasteurized before freezing and whipping.

The invention is illustrated by the following examples, in which all temperatures are in °C.

EXAMPLE 1

Fresh separated hen egg yolk (50 g.) was diluted with pH 7 phosphate buffer (containing 0.08 M sodium chloride, 3.05 mM monosodium phosphate and 5.65 mM disodium phosphate; 120 ml.) to give a cloudy solution containing about 5 percent protein. Succinic anhydride (5.85 g.) was added slowly during 2 hours to the protein solution at 0°, the pH being measured continuously by pH meter and maintained at between 7 and 8 by the dropwise addition to the stirred solution of N sodium hydroxide solution. Stirring was continued at 0° for 3½ hours and the solution was then dialyzed against distilled water at pH 7 for 48 hours and finally freeze-dried. The product (17 g.) was a fluffy yellow powder consisting of egg yolk solids of which the protein had more than 80 percent of its free amino groups acylated with a $\beta$-carboxypropionyl group.

EXAMPLE 2

The acylated egg yolk of example 1 (2.7 g.) was added to water (75.5 g.) and the mixture stirred to dissolve the solid and allowed to stand for 10 minutes at 20°. Sucrose (7.5 g.), dextrose (7.5 g.), salt (2.6 g.), pepper (0.084 g.) and locust bean gum (1 g.) were mixed together in the dry state and added with vigorous stirring to the acylated egg yolk solution, followed by glacial acetic acid (1.4 ml.), to form the aqueous phase of an emulsion.

A mixture of polyoxyethylene sorbitan monopalmitate (containing 20 ethylenoxy groups per molecule; 0.24 g.), and mixed mono- and di-glycerides of fat-forming fatty acids (0.36 g.) (the mixture having a hydrophilic-lipophilic balance of 8) was dissolved in refined soyabean oil (100 g.) to give an oil phase.

The oil phase at 20° was added slowly with vigorous stirring to the aqueous phase at 20° during about 3 minutes, to form a readily pourable salad dressing. A 5 g. portion of the product was sterilized by heating in a tube to 90° for 20 minutes: the product was allowed to cool to ambient temperature and retained its viscosity without any deposition of solid.

EXAMPLE 3

The acylated egg yolk of example 1 (0.68 g.) was added to water (4.1 g.), the suspension stirred and allowed to stand for 10 minutes at 20° and the solution obtained mixed with further water (40.7 g.). Salt (1.36 g.), sucrose (3.38 g.), pepper (0.136 g.), mustard (0.204 g.), carageenan (0.078 g.) and guar gum (0.394 g.) were mixed together in the dry state. These were added with stirring to the acylated egg yolk solution, followed by vinegar (13.6 g.), to give an aqueous phase (72 g.).

A mixture of the polyoxyethylene sorbitan ester emulsifying agent of example 2 (0.326 g.) and the mono- and di- glyceride emulsifying agent of example 2 (0.488 g.), was dissolved in refined soyabean oil (130 g.) to give an oil phase.

The oil phase at 20° was added slowly to the aqueous phase at 20° during about 3 minutes with vigorous stirring to give a salad dressing.

A 5 g. portion of the product was sterilized by heating in a tube to 100° for 20 minutes: on allowing to cool to ambient temperature the product retained its viscosity without deposition of solids.

When in the above formulation, instead of the acylated egg yolk, an amount of fresh egg yolk equivalent in solid content to it was used and the water content of the aqueous phase adjusted accordingly, a similar product was obtained but on sterilization it completely solidified.

EXAMPLE 4

A mayonnaise was prepared using the procedure of example 2, but with the following ingredients:

Aqueous phase

| | |
|---|---|
| Water | 15.4 g. |
| Acylated egg yolk | 2.75 g. |
| Sucrose | 1.38 g. |
| Salt | 0.78 g. |
| Pepper | 0.13 g. |
| Mustard | 0.64 g. |
| Carageenan | 0.05 g. |
| Guar gum | 0.26 g. |
| Vinegar | 13.1 g. |

Oil phase

| | |
|---|---|
| Soyabean oil | 161 g. |
| Polyoxyethylene sorbitan mono-palmitate | 0.51 g. |
| Fatty acid mono- and di-glyceride | 0.74 g. |

On sterilization this formulation deposited no solid.

We claim:

1. N-Carboxyacylated egg yolk protein.
2. A modified protein according to claim 1, in which at least 40 percent of the free amino groups of the protein are substituted by a carboxyacyl group.
3. A modified protein according to claim 1, in which at least 80 percent of the free amino groups are substituted by a carboxyacyl group.
4. A modified protein according to claim 2, in which the carboxyacyl group is a carboxyaliphatic acyl group.
5. A modified protein according to claim 4, in which the carboxyacyl group contains from 4 to 6 carbon atoms.
6. A modified protein according to claim 4, in which the carboxyacyl group is a $\beta$-carboxypropionyl group.
7. An aqueous oil emulsion containing a modified protein according to claim 1.
8. An emulsion according to claim 7, comprising an oil-in-water emulsion.
9. An emulsion according to claim 8, in which the oil is an edible triglyceride oil.
10. An emulsion according to claim 9, whose pH is less than 4.
11. A heat-sterilized emulsion according to claim 10.

* * * * *